(12) United States Patent
Hsu

(10) Patent No.: US 8,723,880 B2
(45) Date of Patent: May 13, 2014

(54) WHITE BALANCE METHOD FOR DISPLAY IMAGE

(75) Inventor: Wei Hsu, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 219 days.

(21) Appl. No.: 13/292,093

(22) Filed: Nov. 9, 2011

(65) Prior Publication Data

US 2013/0050236 A1    Feb. 28, 2013

(30) Foreign Application Priority Data

Aug. 23, 2011    (TW) .............................. 100130090 A

(51) Int. Cl.
| | | |
|---|---|---|
| G09G 5/00 | (2006.01) | |
| G09G 5/02 | (2006.01) | |
| G09G 3/30 | (2006.01) | |
| H04N 5/202 | (2006.01) | |
| H04N 9/73 | (2006.01) | |
| H04N 5/57 | (2006.01) | |
| G06K 9/00 | (2006.01) | |
| G06K 9/40 | (2006.01) | |
| G06K 9/36 | (2006.01) | |
| H04N 1/46 | (2006.01) | |

(52) U.S. Cl.
USPC ........... 345/589; 345/581; 345/593; 345/606; 345/690; 345/77; 348/254; 348/223.1; 348/602; 348/655; 348/687; 358/516; 358/525; 382/164; 382/167; 382/171; 382/274; 382/276

(58) Field of Classification Search
USPC ........... 348/180–182, 254–256, 223.1–227.1, 348/269, 552, 557, 575, 577, 602, 603, 630, 348/655, 671, 674, 687; 345/581, 589, 591, 345/593, 600, 606, 617–619, 204, 690, 694, 345/77, 88–89; 358/515–516, 509, 358/519–520, 525; 382/162, 164–167, 173, 382/171, 254, 274, 270, 276, 282
See application file for complete search history.

(56) References Cited

U.S. PATENT DOCUMENTS

| | | | | |
|---|---|---|---|---|
| 5,555,022 | A * | 9/1996 | Haruki et al. .............. | 348/223.1 |
| 6,727,943 | B1 * | 4/2004 | Juen ........................... | 348/223.1 |
| 6,979,295 | B2 * | 12/2005 | Dubberstein et al. ......... | 600/455 |
| 2004/0090536 | A1 * | 5/2004 | Tsai et al. ................... | 348/223.1 |
| 2005/0041115 | A1 * | 2/2005 | Choi .......................... | 348/223.1 |
| 2007/0086029 | A1 * | 4/2007 | Tsai et al. ..................... | 358/1.9 |
| 2007/0165113 | A1 * | 7/2007 | Suzuki ....................... | 348/223.1 |
| 2007/0177032 | A1 * | 8/2007 | Wong ......................... | 348/223.1 |
| 2009/0021526 | A1 * | 1/2009 | Chiang et al. ................ | 345/605 |
| 2011/0102632 | A1 * | 5/2011 | Tsukagoshi et al. ....... | 348/223.1 |

* cited by examiner

*Primary Examiner* — Wesner Sajous

(74) *Attorney, Agent, or Firm* — Jianq Chyun IP Office

(57) ABSTRACT

A white balance method for a display image is disclosed. The steps of the method includes: measuring gray levels of a basic and reference colors based on a plurality of color temperatures; obtaining reference color gains according to average values of the gray level of the reference and basic colors and a ratio according to the reference color gains corresponding to each of the color temperatures; dividing the display image into a plurality of blocks, and obtaining a reference color gain of each of blocks according to the average values of the gray levels of reference and basic colors, and obtaining a block ratio of each of blocks; generating a selected number corresponding to each of the color temperature according to the ratios and the block ratios; selecting the basic and reference color gains of one of the color temperatures for executing white balance to the display image.

12 Claims, 4 Drawing Sheets

| color temperature | ratio | selected number |
|---|---|---|
| 2300K | 0.26 | 53 |
| 2900K | 0.43 | 112 |
| 4000K | 0.84 | 12 |
| 4150K | 0.84 | 2 |
| 5570K | 1.09 | 0 |
| 6500K | 1.91 | 0 |
| 8170K | 1.57 | 0 |

WHITE BALANCE METHOD FOR DISPLAY IMAGE

CROSS-REFERENCE TO RELATED APPLICATION

This application claims the priority benefit of Taiwan application serial no. 100130090, filed on Aug. 23, 2011. The entirety of the above-mentioned patent application is hereby incorporated by reference herein and made a part of this specification.

BACKGROUND OF THE INVENTION

1. Technical Field

The present invention relates to a white balance method for a display image. More particularly, the present invention relates to a white balance method for a display image through a voting mechanism.

2. Background

In general, the image color displayed on a display device is relevant to the color temperature of the environment thereof. The white balance technique for a display image is to eliminate the display device generating chrominance of white color when the display device is in different environments.

In the prior art, many white balance methods for a display image is provided. In brief, in a white balance method for a display image of a related art, the big color blocks in different colors in the display image are calibrated to be white. Such method may leads to a serious chrominance when processing the display image of which the color of the whole image has a similar color (for example, the whole image is grass or sky). In addition, in a white balance method for a display image of another related art, the brightest area of the display image is taken as the light source for executing the calibration. Since the brightest area of the display image may not be the light source (for example, the yellow color block), such white balance calibrating method just can be selectively adaptable to the display image.

Transformation color space is also used for executing white balance technique in other related arts. However, the transformation color space method may consume much resources of the hardware circuit or processing unit. It comparatively costs if it is put in practice.

SUMMARY OF THE INVENTION

The present invention relates to a white balance method for a display image capable to accurately execute the adjusting of white balance of the display image.

The present invention provides a white balance method for a display image, including the following steps: measuring gray levels of a plurality of colors indicated according to a plurality of gray patches under different color temperatures, wherein the colors comprise a basic color and a plurality of reference colors; Then, obtaining a plurality of reference color gains of each corresponding color temperature according to the average value of the gray levels of the reference colors of each corresponding color temperature and the average value of the gray levels of the basic color, and obtaining a ratio of each corresponding color temperature according to the reference color gains of each corresponding color temperature; After that, dividing the display image into a plurality of blocks; Then, obtaining a plurality of reference color gains of each block according to the average value of the gay levels of the reference colors of each block and the average value of the gray levels of the basic color, and obtaining a block ratio of each block according to the reference color gains; And then, generating a selected number of each corresponding color temperature according to the block ratio of each block and the ratio of each corresponding color temperature; Finally, selecting the reference color gains corresponding to one of the color temperatures and a basic color gain for executing a color compensation of the display image according to the selected number of the color temperatures.

In light of the above, in the present invention, gray patches are used for defining the correlation between the color temperatures and the reference color gains and the ratio thereof The reference color gains of adaptable color temperature of each block and the ratio thereof are calculated by dividing the display image into color blocks. Additionally, by using the voting mechanism, the reference color gains of the most adaptable color temperature and the ratio thereof are selected for individually adjusting each color of the display image, so as to achieve the white balance effect. Thus, the complicated coordinate transformation operation is unnecessary, and the basic color and the reference color can be individually adjusted. The efficiency of the white balance can be effectively improved under the condition of without increasing the cost of software and hardware.

In order to make the aforementioned and other objects, features and advantages of the disclosure comprehensible, embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 5 is a relationship table 500 of the color temperatures, the ratios and the selected number according to the embodiment of the present invention.

DETAILED DESCRIPTION OF DISCLOSED EMBODIMENTS

Figure 1:
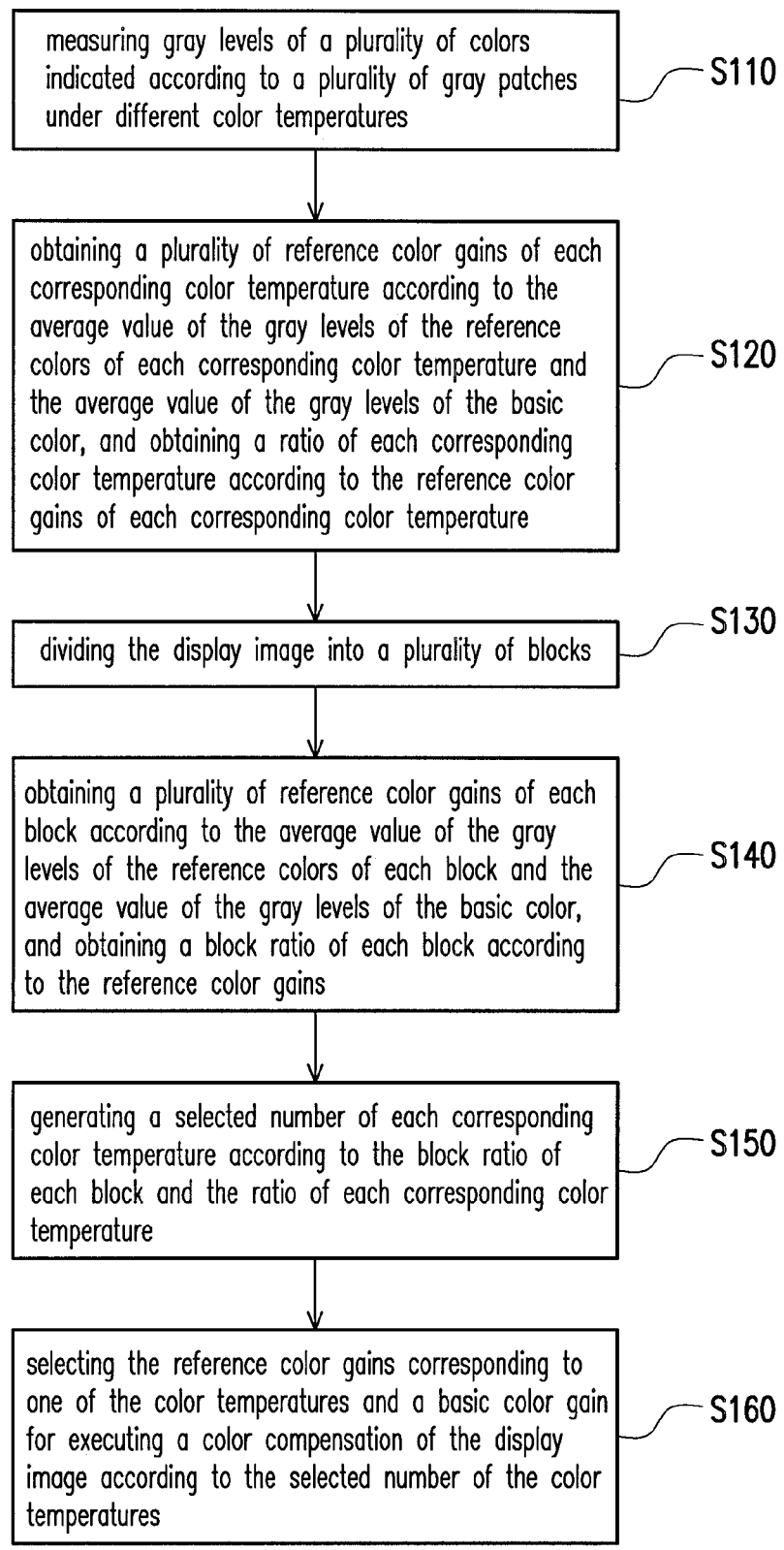
FIG. 1 is a flow chart showing a white balance method for a display image according to an embodiment of the present invention.

Referring to FIG. 1, FIG. 1 is a flow chart showing a white balance method for a display image according to an embodiment of the present invention. The step includes, first measure the gray levels of a plurality of colors indicated according to a plurality of gray patches under different color temperatures, wherein the colors comprise a basic color and a plurality of reference colors (S110). More specifically, a plurality of white color of different gray levels and the gray color blocks are selected to be the gray patches. And under the different environmental color temperatures, the gray level of the display color of each gray patch is measured. Referring to FIG.

Figure 2:
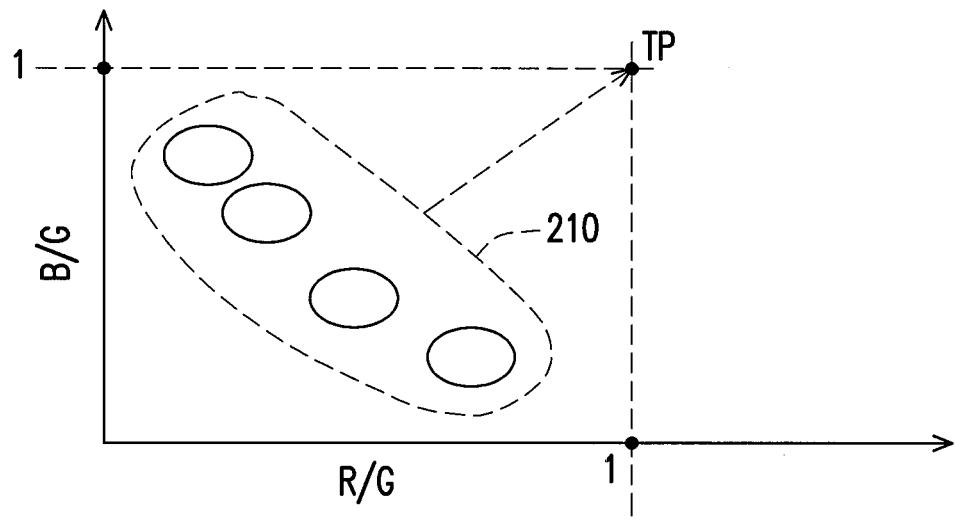
FIG. 2 illustrates the distribution of the gray levels of the gray patches.

2, FIG. 2 illustrates the distribution of the gray levels of the gray patches. In FIG. 2, the X axis is the ratio R/G of the gray levels of the reference color (red) to the gray levels of the basic color (green), while the Y axis is the ratio B/G of the gray levels of another reference color (blue) to the gray levels of the basic color (green).

It is easy to be noted that, the ratio of the displayed reference color of the gray patches of the different gray levels to the gray levels of the basic color is distributed in the distribution area 210. For the requirement of white balance, it has to adjust the gray levels of the reference color (red and blue) and the basic color (green) to be equal, i.e., the gray levels of red, blue and green should be 1:1:1. In other words, the distribution area 210 has to be close to the white balance point TP.

Referring to FIG. 1, after the step S110, obtain a plurality of reference color gains of each corresponding color temperature according to the average value of the gray levels of the reference colors of each corresponding color temperature and the average value of the gray levels of the basic color, and obtain a ratio of each corresponding color temperature according to the reference color gains of each corresponding color temperature (S120). In other words, the average values of the gray levels of the red (reference color), blue (reference color) and green (basic color) of each measured gray patch under the different color temperatures are calculated. The average value of the gray level of the red is divided by the average value of the gray level of the green to obtain the reference color gain of red, and the average value of the gray level of the blue is divided by the average value of the gray level of the green to obtain the reference color gain of blue. And the reference color gain of red is divided by the reference color gain of blue to obtain the ratio of corresponding color temperature.

Figure 3:
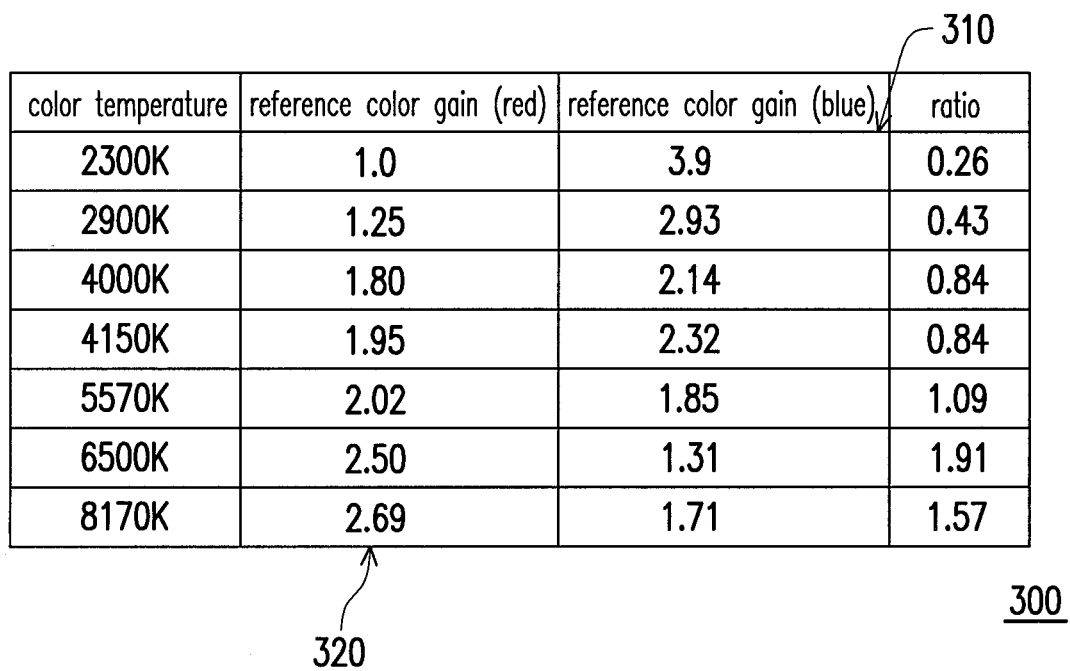
FIG. 3 is a relationship table 300 of the reference color gains, the ratios and the color temperatures generated by the step S120 according to the embodiment of the present invention.

Referring to FIG. 3, FIG. 3 is a relationship table 300 of the reference color gains, the ratios and the color temperatures generated by the step S120 according to the embodiment of the present invention. In the relationship table 300, the reference color gains and the ratio corresponding to the color temperatures 2300K, 2900K, 4000K, 4150K, 5570K, 6500K and 8170K are recorded. For example, corresponding to the color temperature 2300K, if the average value of the gray level of the red is divided by the average value of the gray level of the green, then it can be obtained that the reference color gain of red is equal to 1.0. If the average value of the gray level of the blue is divided by the average value of the gray level of the green, then it can be obtained that the reference color gain of blue is equal to 3.9. If the reference color gain of red (=1.0) is divided by the reference color gain of blue (=3.9), then the ratio of corresponding color temperature 2300K is equal to 0.26.

It has to specifically noted that, in the relationship table 300, the reference color gains of the column 310 and 320 having the maximum reference gain can be obtained by not directly dividing the average value of the gray levels of the reference color of corresponding color temperature by the average value of the gray levels of green. Taking the column 310 as an example, the reference color gain of blue of the column 310 can be obtained by dividing the average value of the gray levels of the reference color of blue corresponding to the color temperature 2300K by the average value of the gray levels of green and further multiplying with an amplification gain. Relatively, in the column 320, the reference color gain of red of the column 320 can be obtained by dividing the average value of the gray levels of the reference color of red corresponding to the color temperature 8170K by the average value of the gray levels of green and further multiplying with the amplification gain.

The amplification gain can be preset according to the restriction of the actual white balance adjusting software and/or hardware. The purpose of setting of amplification gain is to improve the tolerance provided in the relationship table 300.

Figure 4A:
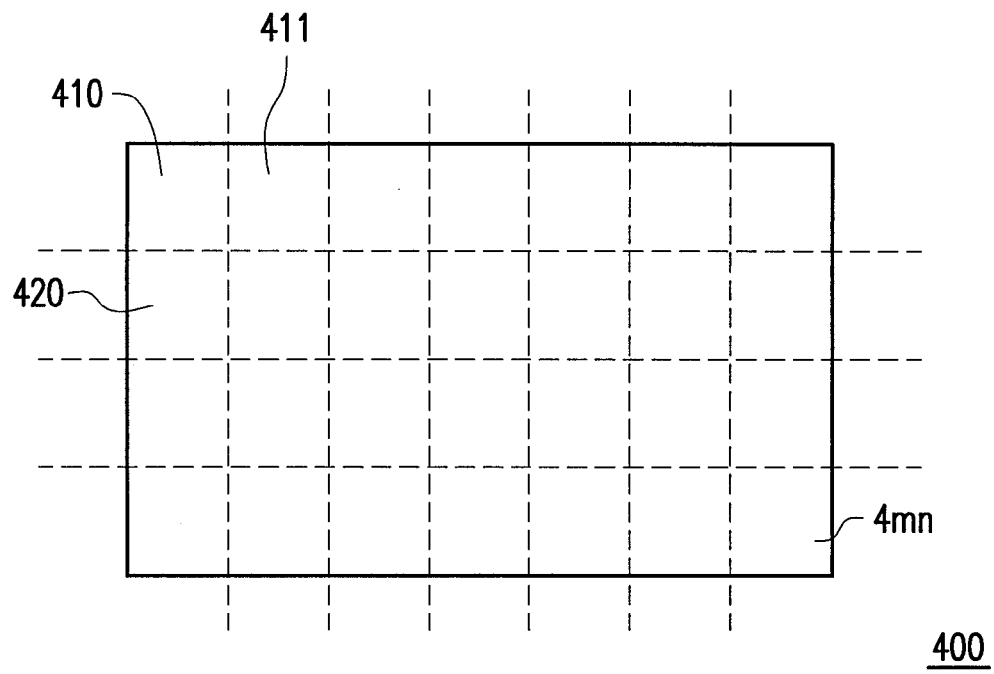
FIG. 4A illustrates the driving method of the display image 400.

Referring to FIG. 1, after the step S120, in the embodiment, the white balance of any of the display image is adjustable. First, the display image is divided into a plurality of blocks (S130). Referring to FIG. 4A, FIG. 4A illustrates the driving method of the display image 400. Herein the display image 400 is divided into blocks 410 to 4$mn$ in a matrix.

Please refer to FIG. 1 again. Then, obtain the plurality of reference color gains of each block 410 to 4$mn$ according to the average value of the gray levels of the reference colors of each block 410 to 4$mn$ and the average value of the gray levels of the basic color, and obtain a block ratio of each block 410 to 4$mn$ according to the reference color gains (S140).

Figure 4B:
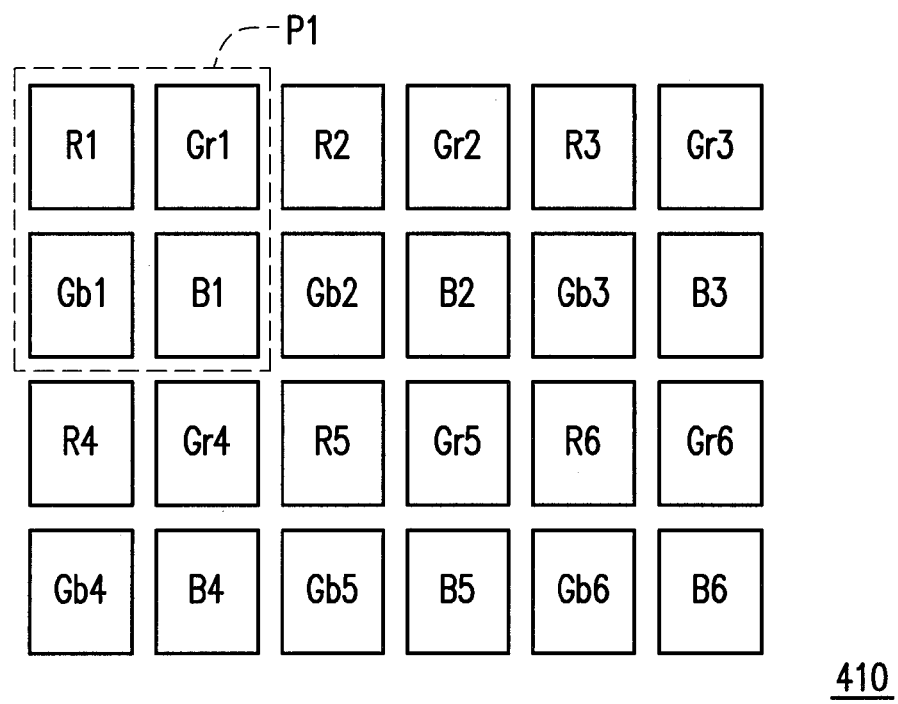
FIG. 4B illustrates the pixel color arrangement of the display image according to an embodiment of the present invention.

Referring to FIG. 4B, FIG. 4B illustrates the pixel color arrangement of the display image according to an embodiment of the present invention. Herein FIG. 4B illustrates the block 410 of FIG. 4A, for example. In FIG. 4B, the green of each pixel is divided into two green components Gb1 to Gb6 and Gr1 to Gr6 arranged in a diagonal line in each pixel. In addition, the red components R1 to R6 and the blue components B1 to B6 of each pixel are arranged in another diagonal line in the pixel.

Then, referring to FIG. 1 and FIG. 4B, in the step S140, taking the block 410 as an example, the average value of gray level of the reference color of red AvgR is equal to (R1+R2+ ... +R6)/6, the average value of gray level of the reference color of blue AvgB is equal to (B1+B2+ ... +B6)/6, and the average value of gray level of the reference color of green AvgG is equal to ((Gb1+Gb2+ ... +Gb6)/6+(Gr1+Gr2+ ... +Gr6)/6)/2. The reference color gain of red Block_RGain is equal to AvgG/AvgR, the reference color gain of blue Block_BGain is equal to AvgG/AvgB, and the block ratio Block_R_div_B of the block 410 is equal to Block_RGain/Block_BGain.

After the reference color gain of red Block_RGain, the reference color gain of blue Block_BGain and the block ration Block_R_div_B of each block are calculated, the selected number of each corresponding color temperature can be generated according to the block ratio Block_R_div_B of each block and the ratio of each corresponding color temperature (S150). In brief, the calculated block ratio Block_R_div_B of each block and the ratio of each corresponding color temperature calculated in step S120 are compared, the selected number of the color temperature close to the block ration Block_R_div_B of each block most is increased.

Referring to FIG. 5, FIG. 5 is a relationship table 500 of the color temperatures, the ratios and the selected number according to the embodiment of the present invention. Taking the relationship table 500 as an example, assume that if the block ratio Block_R_div_B is equal to 0.27, since 0.27 is the closest to the ratio 0.26 of the color temperature 2300K, the selected number corresponding to the color temperature 2300K is increased (for example, increase 1). As shown in the relationship table 500, there are 53 blocks whose ratio corresponding to the color temperature of 2300K is the closest to the block ratio Block_R_div_B, 112 blocks whose ratio corresponding to the color temperature of 2900K is the closest to the block ratio Block_R_div_B, 12 blocks whose ratio corresponding to the color temperature of 4000K is the closest to the block ratio Block_R_div_B and 2 blocks whose ratio corresponding to the color temperature of 4150K is the closest to the block ratio Block_R_div_B.

In the above mentioned method of determining whether one of the ratios corresponding to the color temperatures is the closest to the block ratio of each block, the corresponding color temperature of the selected number to be increased can be obtained by after calculating the absolute values of the difference between the block ratio of each block and the ratio corresponding to the color temperature and selecting the minimum of the absolute values.

In addition, it should be noted that before the accumulating selected number, it can also be determined whether the block ratio of each block is in the range of maximum and minimum of the ratio of all corresponding color temperatures. If the block ratio of the block is out of the range of ratio, the correspondingly increasing the selected number is not executed. Taking the relationship table 500 of FIG. 5 as an example, if the block ratio is greater than 1.91 or smaller than 0.26, the block is not used for executing the increasing the selected number.

Referring to FIG. 1, after the step S150, the reference color gains corresponding to one of the color temperatures and a basic color gain are selected for executing a color compensation of the display image according to the selected number of the color temperatures (S160). More specifically, when the display image is the first display image, the selected color temperature is the color temperature having the largest selected number among each of the color temperatures. The plurality of reference color gains of the selected color temperatures are set to be individually equal to the plurality of reference color initial adjusting gains and the basic color initial adjusting gain is set to be equal to 1. Referring to the relationship table 500 of FIG. 5, wherein the selected color temperature is 2900K having the maximum selected number 112. Referring to the relationship table 300 of FIG. 3, the reference color gain of red corresponding to the color temperature 2900K is 1.25, and the reference color gain of blue corresponding to the color temperature 2900K is 2.93. Thus, the reference color initial adjusting gain of red can be set as 1.25, the reference color initial adjusting gain of blue can be set as 2.93. Additionally, the basic color initial adjusting gain is set to be equal to 1.

In this way, the first display image can be executed the color adjusting according the reference color initial adjusting gain of red, the reference color initial adjusting gain of blue and the basic color initial adjusting gain, so as to execute the white balance of the display image.

Furthermore, if the display image is not the first display image, instead is the second display image, then the three conditions, whether the block ratio of each block is in the range of ratio, whether the reference color gain of each block is smaller than the amplification reference color gain and whether the average value of the gray level of the basic color of each block is in the basic color sensing range, are simultaneously determined If the three conditions are founded (they are all determined YES), the average value of the gray level of the reference color of each block and the average value of the gray level of the basic color are respectively accumulated, so that a plurality of reference color gray average accumulative values and the gray average accumulative value of the basic color can be obtained. Herein the basic color sensing range is the linear range of the basic color (green) detected by the sensor.

Then, the plurality of reference color reference adjusting gains can be obtained by calculating the ratios of the gray average accumulative value of the basic color to the reference color gray average accumulative value, and a basic color reference adjusting gain can be obtained according to the ratio between the reference color reference adjusting gains. The ratio can be obtained by the division, and it is not repeated thereto.

Finally, the plurality of reference color renewing adjusting gains can be obtained according to the average value of the reference color reference adjusting gains and the reference color initial adjusting gains, and a basic color renewing adjusting gain can be obtained according to the average value of the basic color reference adjusting gain and the basic color initial adjusting gain. Therefore, the basic color renewing adjusting gain and the reference color renewing adjusting gain can be used for executing the white balance adjusting of the second display image.

It should be noted that the plurality of absolute values of the differences of the reference color reference adjusting gains and the reference color adjusting gains corresponding to the selected color temperature are respectively calculated in the present embodiment, and the sum of the absolute values of the differences is calculated. Whether the reference color reference adjusting gain and the basic color reference adjusting gain are reasonable values is determined by determining whether the sum of the absolute values of the differences is larger than the reference color adjusting range. Once the sum of the absolute values of the differences is much larger (larger than the reference color adjusting range), it means that the reference color reference adjusting gain and the basic color reference adjusting gain are not reasonable, and the reference color reference adjusting gain and the basic color reference adjusting gain are not used to generate the basic color renewing adjusting gain and the reference color renewing adjusting gain.

Moreover, in the executing the white balance adjusting of the third display image, the basic color initial adjusting gain is set to be equal to the basic color renewing adjusting gain, and the reference color initial adjusting gains are set to be equal to the reference color renewing adjusting gains. And then, by using the method of generating the basic color renewing adjusting gain and the reference color renewing adjusting gain of the second display image, the white balance adjusting of the third display image (or the fourth and so on) can be executed.

In light of the foregoing, in the present invention, gray patches are used for defining the relationship table of the reference color gains, the ratio and the color temperatures. Then the gray levels displayed by the blocks of the display image are used to establish the relationship table of the corresponding gray patches for executing the counting (voting) of the selected number. By selecting the basic and reference color gain of the corresponding color temperature having the highest selected number, the white balance adjusting gain of the display image can be obtained. Therefore, the white balance adjustment of the display image is executed by according to the basic color (e.g., green) and the reference color (e.g., blue and red) respectively, and the efficiency of white balance can be effectively improved. Furthermore, the complicated coordinate transformation operation is unnecessary in the present invention, and thus the increasing of the cost of software and hardware is also unnecessary.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A white balance method for a display image, comprising:
  measuring gray levels of a plurality of colors indicated according to a plurality of gray patches under different color temperatures by a processor, wherein the colors comprise a basic color and a plurality of reference colors;
  obtaining a plurality of reference color gains of each corresponding color temperature according to an average value of the gray levels of the reference colors of each corresponding color temperature and the average value of the gray levels of the basic color by the processor, and obtaining a ratio of each corresponding color temperature according to the reference color gains of each corresponding color temperature by the processor;
  dividing the display image into a plurality of blocks by the processor;
  obtaining a plurality of reference color gains of each block according to the average value of the gray levels of the reference colors of each block and the average value of the gray levels of the basic color by the processor, and obtaining a block ratio of each block according to the reference color gains by the processor;
  generating a selected number of each corresponding color temperature according to the block ratio of each block and the ratio of each corresponding color temperature by the processor; and
  selecting the reference color gains corresponding to one of the color temperatures and a basic color gain for executing a color compensation of the display image according to the selected number of the color temperatures by the processor.

2. The white balance method for the display image as claimed in claim 1, wherein the step "obtaining a plurality of reference color gains of each corresponding color temperature according to the average value of the gray levels of the reference colors of each corresponding color temperature and the average value of the gray levels of the basic color" comprises:
  obtaining the reference color gains of each corresponding color temperature by calculating the average value of the gray levels of the reference colors of each corresponding color temperature and the average value of the gray levels of the basic color.

3. The white balance method for the display image as claimed in claim 1, wherein the step "obtaining a ratio of each corresponding color temperature according to the reference color gains of each corresponding color temperature" comprises:
  obtaining the ratio of each corresponding color temperature by calculating the ratio of the reference color gains of each corresponding color temperature.

4. The white balance method for the display image as claimed in claim 1, wherein the step "obtaining a plurality of reference color gains of each block according to the average value of the gray levels of the reference colors of each block and the average value of the gray levels of the basic color" comprises:
  obtaining the reference color gains of each corresponding color temperature by calculating the average value of the gray levels of the reference colors of each block and the average value of the gray levels of the basic color.

5. The white balance method for the display image as claimed in claim 1, wherein the step "obtaining a block ratio of each block according to the reference color gains" comprises:
  obtaining the block ratio of each block by calculating the ratio of the reference color gains of each block.

6. The white balance method for the display image as claimed in claim 1, wherein the step "generating a selected number of each corresponding color temperature according to the block ratio of each block and the ratio of each corresponding color temperature" comprises:
  calculating a plurality of differences between the block ratio of the block and the ratio of each corresponding color temperature; and
  selecting a selected color temperature corresponding to the minimum of the differences and increasing the selected number of the selected color temperature.

7. The white balance method for the display image as claimed in claim 1, wherein the basic color is green, the reference colors are blue and red.

8. The white balance method for the display image as claimed in claim 1, further comprising:
  multiplying an amplification gain to the maximum of the reference color gains of the color temperatures for obtaining a plurality of amplification reference color gains by the processor; and
  obtaining a ratio range of the ratio of each corresponding color temperature after adjusted according to the reference color gains, the amplification reference color gains and the reference color gains of each corresponding color temperature by the processor,
  wherein the amplification gain is greater than 1.

9. The white balance method for the display image as claimed in claim 8, wherein the step "selecting the reference color gains corresponding to one of the color temperatures and a basic color gain for executing a color compensation of the display image according to the selected number of the color temperatures" comprises:
  making the maximum of the selected numbers corresponding to the color temperature a selected color temperature when the display image is a first display image, and making the reference color gains of the selected color temperature equal to a plurality of reference color initial adjusting gains; and
  making a basic color initial adjusting gain equal to 1.

10. The white balance method for the display image as claimed in claim 9, wherein the step "selecting the reference color gains corresponding to one of the color temperatures and a basic color gain for executing a color compensation of the display image according to the selected number of the color temperatures" further comprises:
  when the display image is not the first display image;
  determining whether the block ratio of each block is in the ratio range, determining whether the reference color gains of each block are smaller than the amplification reference color gains, and determining whether the average value of the gray levels of the basic color of each block is in a basic color sensing range;
  respectively obtaining a plurality of reference color gray average accumulative values and a plurality of gray average accumulative values of a basic color by respectively accumulating the average value of the gray levels of the reference colors of each block and the average value of the gray levels of the basic color;
  obtaining a plurality of reference color reference adjusting gains by calculating the ratio of the gray average accumulative value of the basic color to the reference color gray average accumulative value, and obtaining a basic color reference adjusting gain according to the ratio between the reference color reference adjusting gains; and obtaining a plurality of reference color renewing adjusting gains according to the average value of the reference color reference adjusting gains and the reference color initial adjusting gains, and obtaining a basic color renewing adjusting gain according to the average value of the basic color reference adjusting gain and the basic color initial adjusting gain.

11. The white balance method for the display image as claimed in claim 10, wherein the step "selecting the reference color gains corresponding to one of the color temperatures and a basic color gain for executing a color compensation of the display image according to the selected number of the color temperatures" further comprises:

respectively calculating a plurality of absolute values of the differences of the reference color reference adjusting gains and the reference color adjusting gains corresponding to the selected color temperature, and calculating the sum of the absolute values of the differences; and determining whether the sum of the absolute values of the differences is greater than a reference color adjusting range.

12. The white balance method for the display image as claimed in claim 10, wherein the step "selecting the reference color gains corresponding to one of the color temperatures and a basic color gain for executing a color compensation of the display image according to the selected number of the color temperatures" further comprises:

making the basic color initial adjusting gain equal to the basic color renewing adjusting gain, and making the reference color initial adjusting gains equal to the reference color renewing adjusting gains.

* * * * *